United States Patent [19]
Jennings et al.

[11] Patent Number: 5,394,494
[45] Date of Patent: Feb. 28, 1995

[54] FIBER OPTIC INLINE CONNECTOR WITH HERMAPHRODITIC ALIGNMENT AND LOCK MEANS

[75] Inventors: Kurt L. Jennings, Warren; James R. Cirillo, Youngstown; James M. Cardinal, Columbus, all of Ohio

[73] Assignee: General Motors Corporation, Detroit, Mich.

[21] Appl. No.: 186,941

[22] Filed: Jan. 27, 1994

[51] Int. Cl.$^6$ .............................................. G02B 6/38
[52] U.S. Cl. ...................................... 385/58; 385/59; 385/60; 385/66; 385/77; 385/78; 385/84
[58] Field of Search ................. 385/53, 55, 56, 58, 385/59, 60, 66, 75, 76, 77, 78, 84

[56] References Cited
U.S. PATENT DOCUMENTS

| | | | |
|---|---|---|---|
| 4,094,580 | 6/1978 | Cook et al. | 385/64 |
| 4,184,742 | 1/1980 | Corrales | 385/78 |
| 4,279,466 | 7/1981 | Makuch et al. | 385/59 |
| 4,478,487 | 10/1984 | Obeissart | 385/66 |
| 4,953,944 | 9/1990 | Moulin | 385/58 |
| 4,981,336 | 1/1991 | Mohan | 385/56 |
| 5,210,810 | 5/1993 | Darden et al. | 385/78 |

*Primary Examiner*—Frank Gonzalez
*Attorney, Agent, or Firm*—William A. Schuetz

[57] ABSTRACT

A fiber optic inline connector includes mating connector bodies each of which has a concentric protrusion at a connector end and a concentric cable passage that extends through the connector body from the connector end to a cable end. The concentric protrusions include a pair of diametrically opposed prongs and a pair of diametrically opposed slots that are orthogonally related to the diametrically opposed prongs so that the slots of each protrusion receive the prongs of the other protrusion to align the cable passages when the connector bodies are mated. The mated connector bodies are locked together by a pair of diametrically opposed stiff lock tongues and a pair of diametrically opposed flexible lock fingers at the connector end of each connector body that are spaced radially outwardly of the respective protrusions. The flexible lock fingers are orthogonally related to the stiff lock tongues so that the flexible lock fingers of each connector body engage the stiff lock tongues of the other connector body to lock the connectors together. A one-way connector and several interconnectable multi-way connectors are disclosed. An alternate three-way connector has three equally circumferentially spaced prongs, slots, flexible lock fingers and lock tongues.

14 Claims, 3 Drawing Sheets

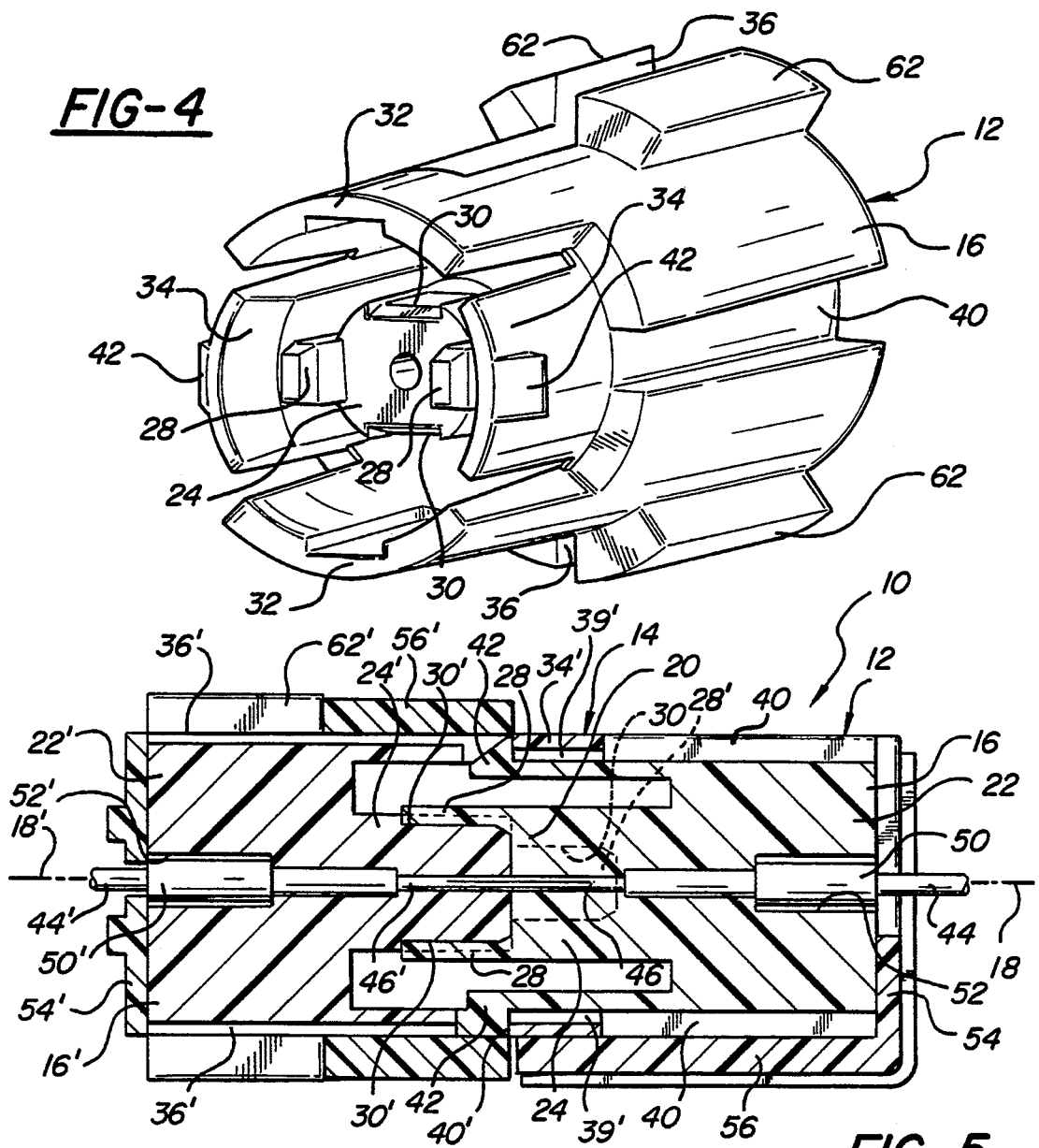
FIG-4
FIG-5
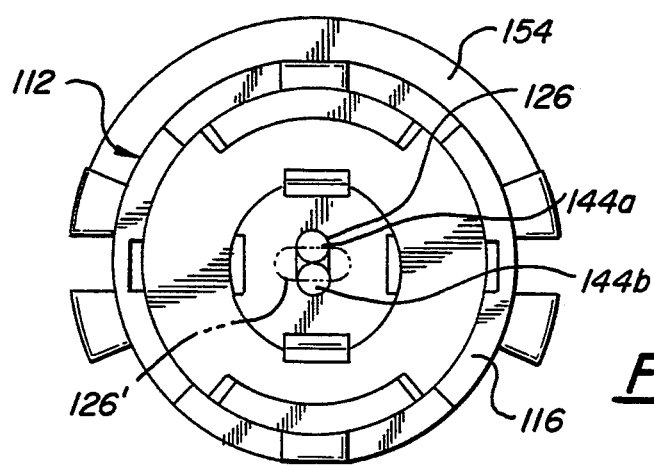
FIG-6

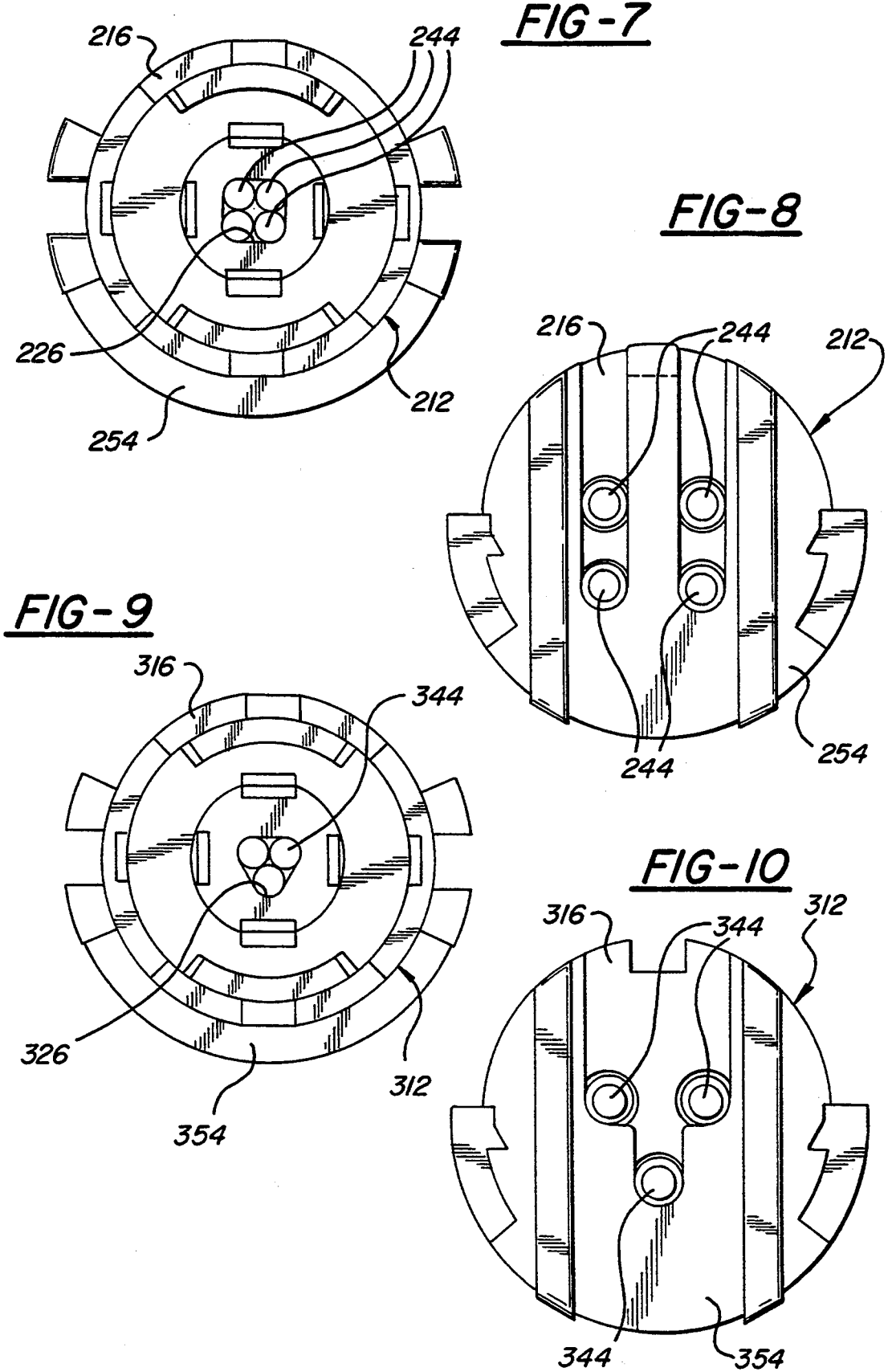

FIBER OPTIC INLINE CONNECTOR WITH HERMAPHRODITIC ALIGNMENT AND LOCK MEANS

BACKGROUND OF THE INVENTION

This invention relates generally to fiber optic distribution systems and more particularly to fiber optic inline connectors for such systems.

A fiber optic distribution system can be used, for example, for interior lighting in automobiles. An automotive fiber optic interior lighting (FOIL) system generally comprises a light source and a fiber optic harness assembly that has a bundle of jacketed fiber optic cables for conveying light from the light source to courtesy lights, indicator lights and other lit devices at various locations in the automobile. Practical considerations require that the fiber optic harness assembly is made up of a number of fiber optic sub-harnesses that are connected together. This usually takes the form of a main fiber optic harness that is split into two branches that run down opposite sides of the automobile. These branches of the main fiber optic harness are then connected by fiber optic inline connectors to several fiber optic sub-harnesses that may be installed in doors, headliners, instrument panels or other parts of the automobile. In some instances a fiber optic sub-harness may be connected to another fiber-optic sub-harness.

The fiber optic sub-harness may have one or several fiber optic cables that need to be connected to one or several fiber optic cables of the main fiber optic harness or another fiber optic sub-harness. Thus there is a need for a family of fiber optic inline connectors for connecting one or more fiber optic cables to the same or a different number of fiber optic cables.

SUMMARY OF THE INVENTION

The object of this invention is to provide a family of fiber optic inline connectors for connecting one or more fiber optic cables to the same or a different number of fiber optic cables in a fiber optic distribution system.

A feature of the invention is that the fiber optic inline connectors are provided in one-way and several multi-way configurations that may be interconnected to each other.

Another feature of the invention is that the fiber optic inline connectors have connector bodies that are equipped with dedicated hermaphroditic alignment structure that aligns the cable passages of the interconnected connectors accurately.

Still another feature of the invention is that the fiber optic inline connectors have connector bodies equipped with hermaphroditic connector lock structure at the connector end that locks the interconnected connectors together securely.

Still yet another feature of the invention is that the fiber optic inline connectors have connector bodies that have concentric cable passages and concentric hermaphroditic connector locks at the connector end that permits the interconnection of one-way and multi-way configurations of the connectors.

Still yet another feature of the invention is that fiber optic inline connectors have connector bodies that have hermaphroditic connector locks that permit the interconnection of one-way and multi-way configurations of the connectors and independent hermaphroditic alignment structure that aligns concentric passages of the interconnected connectors accurately.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 4 is a perspective view of the connector that is shown in FIG. 3;

FIG. 5 is a longitudinal section of the one-way fiber optic connector assembly of FIG. 1 equipped with two terminal position assurance devices;

FIG. 6 is a front view of a two-way fiber optic connector in accordance with the invention;

FIG. 7 is a front view of a four-way fiber optic connector in accordance with the invention;

FIG. 8 is a rear view of the four way fiber optic connector shown in FIG. 7;

FIG. 9 is a front view of a three-way fiber optic connector in accordance with the invention; and FIG. 10 is a rear view of the three-way fiber optic connector shown in FIG. 9.

DESCRIPTION OF THE INVENTION

Figure 1:
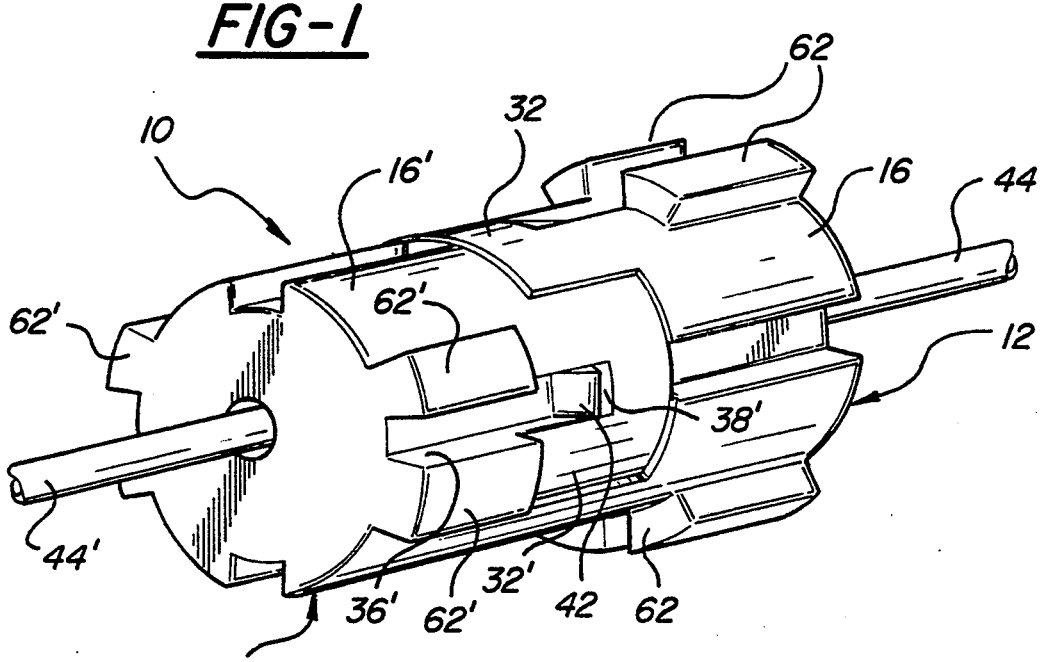
FIG. 1 is a perspective view of a one-way fiber optic inline connector assembly in accordance with the invention.

Referring now to the drawing, FIGS. 1-4 show a one-way fiber optic inline connector assembly 10 comprising two identical one-way fiber optic inline connectors 12 and 14 in accordance with the invention;

The fiber optic inline connector 12 comprises a connector body 16 having a centerline 18, a connector end 20 and a cable end 22. The connector body 16 includes a concentric protrusion 24 at the connector end and a concentric cable passage 26 that extends through the connector body from the connector end to the cable end.

As indicated above the fiber optic cable connector 14 is identical. For simplicity the corresponding parts are identified with the same numerals. However the numerals identifying parts of connector 14 are primed to avoid confusion.

Figure 3:
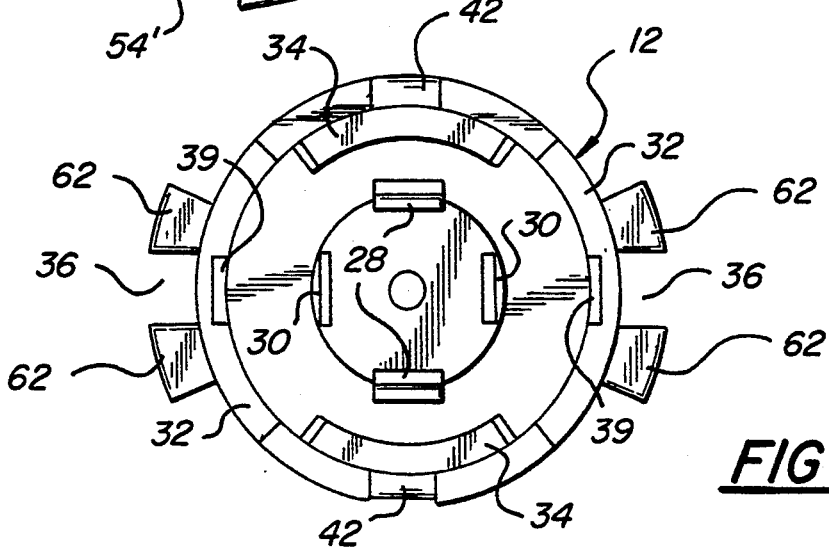
FIG. 3 is a front view of one of the connectors of the hermaphroditic fiber optic connector assembly of FIGS. 1 and 2.

The connector body 16 has hermaphroditic alignment means for aligning the concentric cable passage 26 with the concentric cable passage 26″ of the identical mating connector 14 that has a like alignment means. The hermaphroditic alignment means takes the form of the protrusion 24 having a pair of diametrically opposed prongs 28 and a pair of diametrically opposed slots 30. The pair of diametrically opposed slots 30 are orthogonally related to the diametrically opposed prongs 28 as best shown in FIG. 3. Thus the slots 30 receive the prongs 28′ of the mating connector body 16′ while the slots 30′ of the mating connector body 16′ receive the prongs 28 of the connector body 16 when the connectors 12 and 14 are mated as best shown in FIG. 4.

The connector body 16 also has hermaphroditic lock means for locking the connector body 16 to the mating connector body 16′ that has a like lock means. The hermaphroditic lock means takes the form of a pair of diametrically opposed lock tongues 32 at the connector end that are spaced radially outwardly of the protrusion 24 and a pair of diametrically opposed flexible lock fingers 34 at the connector end that are spaced radially outwardly of the protrusion. The lock fingers 34 are orthogonally related to the lock tongues 32 so that the lock tongues 32 and lock fingers 34 engage the lock fingers 34' and lock tongues 32' of mating connector body 16' respectively.

The cable end of the connector bodies 16, 16' have two pairs of diametrically opposed orthogonally related slots. Pairs of slots 36, 36' extend into the pairs of lock tongues 32, 32' to provide lock shoulders 38, 38' while the pairs of slots 40, 40' align with lock fingers 34, 34' centrally to facilitate molding radially extending lock nibs 42, 42'. The pairs of lock tongues 32, 32' also have inner slots 39, 39' to facilitate molding the lock shoulders 38, 38' with by-pass cores and eliminate the need for side core molding.

The lock fingers 34, 34' are radially inward of the lock tongues 32, 32' so that the lock fingers of one connector body fit inside the lock tongues of the other connector body and the nibs engage the lock shoulders when the connectors 12 and 14 are mated.

The fiber optic inline connectors 12 and 14 each have jacketed fiber optic cables 44, 44' respectively. The cables comprise light transmitting cores 46, 46' of plastic, fiber glass or other suitable light transmitting material in an outer sheath or jacket 48, 48' of light reflective or opaque material. The cables 46, 46' are terminated by stripping their respective jackets 48, 48' away to expose a predetermined length of core 46, 46' at the end of the respective cables as shown in FIG. 4. The bare core end of each fiber optic cable is threaded through a cylindrical ferrule 50, 50' of metal or plastic that is then crimped onto the jacket near the bare core end. The end face of each bare core end is finished preferably after the ferrule is attached. The terminated fiber optic cables 44, 44' are then inserted into the respective cable passages until the cylindrical ferrules 50, 50' engage internal stop shoulders defining terminal cavity portions 52, 52' of the cable passages at the cable end of the connector bodies 16, 16'.

The ends of the cables 44, 44' are retained in the cable passages 26, 26' by terminal position assurance devices or TPAs 54, 54' attached to the cable ends of the connector bodies 16, 16' respectively.

Figure 2:
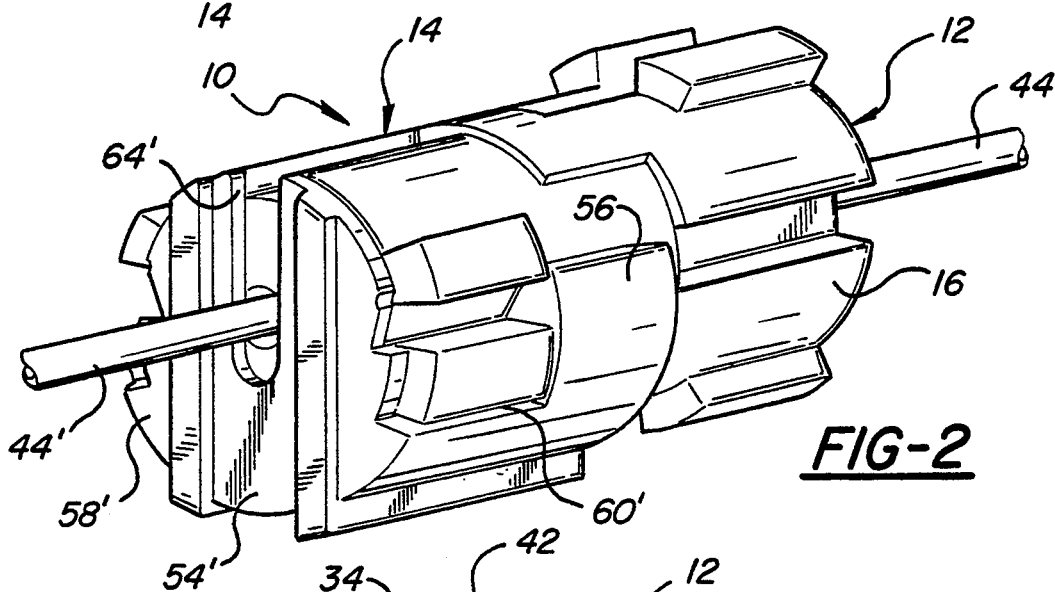
FIG. 2 is a perspective view of the one-way fiber optic connector assembly of FIG. 1 equipped with a terminal position assurance device.

The TPAs comprise resilient part circular shells 56, 56 integrally attached at one end to end walls 58, 58' The shells 56, 56' are snapped onto the cable ends of the connector bodies 16, 16' with their respective end walls 58, 58' engaging the cable end face of the connector bodies as best shown in figures 2 and 4. The shells 56, 56' have undercut slots 60, 60' in each side that receive diametrically opposed radial tabs 62, 62' at the cable ends of the connector bodies 16, 16'. The radial tabs 62, 62' are bifurcated by the slots 36, 36' that were discussed above. In any event, the radial tabs 62, 62' fit into the undercut side slots 60, 60' to retain the TPAs 54, 54' in the centerline or axial direction and to locate the TPAs 54, 54' in the correct circumferential position on the connector bodies 16, 16'.

The end walls 58, 58' have a slot 64, 64' that is substantially the same width as the diameter of the jacketed fiber optic cable 44, 44' so that the edges of the end wall 58, 58' adjacent the slot 64, 64' engage the end of the ferrule 50, 50' to retain the ferrule in the terminal cavity portion 52, 52' and hence the end of the cable 44, 44' in the connector body 16, 16' as shown in FIG. 4.

As indicated above, the fiber optic inline connectors 12 and 14 are identical. Moreover the identical one-way connector bodies 16, 16' have hermaphroditic alignment means and hermaphroditic lock means that are identical and configured so that the connector bodies 16, 16' mate with each other.

FIG. 6 shows a two way connector 112 that has a connector body 116 that is identical to the connector bodies 16, 16' except that cable passage 126 is oval shaped to accommodate two fiber optic cables a and b. Thus this two-way connector body 116 also has the same hemaphoditic alignment means and the same hemaphoditic lock means as the one-way connectors 12 and 14 discussed above. Consequently the two way connector 112 comprising this connector body 116, two fiber optic cables 144a and 144b terminated like cable 44, 44' and a TPA 154 like TPAs 54, 54' can be mated with another identical two-way connector 112 or a one-way connector such as connector 12 or 14. An identically shaped TPA can be used because the fiber optic cables 144a and 144b align in the direction of the slot 164.

When the two way connector 112 is mated to an identical two way connector, the oval cable passages 126 are orthogonally related. This produces a partial alignment of the end faces of the fiber optic cable cores and the same is true when a two-way connector is mated to a one-way connector. However, this partial alignment is generally sufficient for most applications particularly when the two way inline connectors are used as a two node star connector.

In those instances where a complete coincidence of the core end faces is desired, a modified two-way connector body having an oval cable passage 126' perpendicularly oriented with respect to the oval cable passage 126 as shown in phantom in FIG. 5 may be used. The TPA for this modified two-way connector must also be modified to provide two slots for the respective fiber optic cables. This modified TPA is shown in FIG. 6 in conjunction with a four-way connector which is discussed below.

FIGS. 7 and 8 show a four way connector 212 having a connector body 216 that is identical to the connector bodies 16, 16', 116 and 116' except that cable passage 226 is rectangular to accommodate four fiber optic cables. This four-way connector body 216 also has the same hemaphoditic alignment means and the same hemaphoditic lock means as the one-way connectors 12 and 14 and the two way connectors using the connector body 116 or the modified connector body 116' discussed above. Consequently four way connectors 212 comprising four-way connector body 216, four fiber optic cables 244 terminated like cables 44, 44' and a double slotted TPA 254 can be mated with one another, witch the one-way connectors 12 and 14 or either of the two-way connectors 112 described above.

When the four-way connector 212 is mated to an identical four-way connector, the rectangular cable passages 226 align exactly and the core end faces of the respective cables coincide. However, the core end faces of the four fiber optic cables are only partially aligned with the core end faces of the one-way and two-way fiber optic connectors. But as indicated above, this partially alignment is generally sufficient for most applications.

FIGS. 9 and 10 show a three way connector 312 having a connector body 316 that is identical to the connector bodies 16, 16', 116 116' and 216 except that cable passage 326 is triangular to accommodate three fiber optic cables 344. This three-way connector body 316 also has the same hemaphoditic alignment means and the same hemaphoditic lock means as the one-way connectors 12 and 14, the two way connectors 112 using the connector body 116 or the modified connector body and the four-way connectors 212 using the connector body 216. Consequently the three way connectors comprising three-way connector body 316, three fiber optic cables 344 terminated like cables 44, 44' and a suitably configured TPA 354 can be mated with one another, with the one-way connectors, the two-way connectors and the four-way connectors described above.

When the three-way connector 312 is mated to an identical three way connector, the triangular cable passages do not align exactly and the same is true when the three-way connector is mated to the one-way connector, the two-way connector or the four-way connector. For those instances where an exact coincidence of the three core end faces of the respective cables is desired, the three-way connector can be modified so that the triangular cable passage 326' is rotated 30° clockwise as shown in phantom in FIG. 9. In this case the TPA for the four-way connector shown in FIG. 8 is used. The three-way connector can also be modified to produce such a result simply by using three equally circumferentially spaced prongs, slots, lock tongues and lock fingers instead of two. This latter modification, however, sacrifices use with the other inline connectors described above.

While one-way, two-way, three-way and four-way connectors have been described, other multi-way connectors in accordance with the invention are also possible. Even though the inline connectors have been explained in conjunction with a lighting system, the inline connectors can also be used for data communication to share data from one point to another or several other points. Such connectors are referred to as splitters. Two identical two-way connectors could also be used as a two node star connector. Multi-way connectors can also be used to transmit light from plural source to selected output devices with the proper indexing.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A fiber optic inline connector comprising:
   a connector body having a centerline, a connector end and a cable end,
   the connector body including a concentric protrusion at the connector end and a concentric cable passage that extends through the connector body from the connector end to the cable end;
   hermaphroditic alignment means for aligning the concentric cable passage with a concentric cable passage of a mating connector having like alignment means, and hermaphroditic lock means for locking the connector body to a mating connector body having like lock means.

2. The fiber optic inline connector as defined in claim 1 wherein the hermaphroditic alignment means comprises the protrusion having a prong and a slot that is circumferentially spaced from the prong so that the slot is adapted to receive a prong of a like connector body when the connector body is connected to the like connector body.

3. The fiber optic inline connector body as defined in claim 1 wherein the hermaphroditic lock means comprises a stiff lock tongue at the connector end that is spaced radially outwardly of the protrusion, and a flexible lock finger at the connector end that is spaced radially outwardly of the protrusion and that is circumferentially spaced from the stiff lock tongue so that the flexible lock tongue is adapted to engage a stiff lock tongue of a like connector body when the connector body is connected to the like connector body.

4. A fiber optic inline connector comprising:
   a connector body having a centerline, a connector end and a cable end,
   the connector body including a concentric protrusion at the connector end and a concentric cable passage that extends through the connector body from the connector end to the cable end;
   hermaphroditic alignment means for aligning the concentric cable passage with a concentric cable passage of a mating connector having like alignment means comprising:
   the protrusion having a plurality of circumferentially spaced prongs and a plurality of slots between the prongs that are adapted to receive prongs of a like connector body when the connector body is interconnected to the like connector body, and
   hermaphroditic lock means for locking the connector body to a mating connector body having like lock means comprising,
   a plurality of circumferentially spaced stiff lock tongues at the connector end that are spaced radially outwardly of the protrusion, and
   a plurality of circumferentially spaced flexible lock fingers at the connector end that are spaced radially outwardly of the protrusion and that are disposed between the stiff lock tongues whereby the flexible lock fingers are adapted to engage stiff lock tongues of a like connector body when the connector body is interconnected to a like connector body.

5. The fiber optic inline connector as defined in claim 4 wherein the cable passage is circular for accommodating a single fiber optic cable.

6. The fiber optic inline connector as defined in claim 4 wherein the cable passage is shaped for accommodating a plurality of fiber optic cables.

7. The fiber optic inline connector as defined in claim 4 wherein the protrusion has pairs of diametrically opposed prongs and slots that are orthogonally related and wherein the connector body has pairs of diametrically opposed stiff lock tongues flexible lock fingers that are orthogonally related.

8. The fiber optic inline connector as defined in claim 4 wherein the protrusion has three prongs and three slots that are equally circumferentially spaced and wherein the connector body has three stiff lock tongues and three flexible lock fingers that are equally circumferentially spaced.

9. A fiber optic inline connector comprising:

a connector body having a centerline, a connector end and a cable end, the connector body including a concentric protrusion at the connector end and a concentric cable passage that extends through the connector body from the connector end to the cable end;

hermaphroditic alignment means for aligning the concentric cable passage with a concentric cable passage of a mating connector having like alignment means comprising:

the protrusion having a pair of diametrically opposed eccentric prongs and a pair of diametrically opposed slots that are orthogonally related to the diametrically opposed fingers so that the slots are adapted to receive diametrically opposed prongs of a mating connector body having like alignment means, and hermaphroditic lock means for locking the connector body to a mating connector body having like lock means comprising, a pair of diametrically opposed lock tongues at the connector end that are spaced radially outwardly of the protrusion, and a pair of diametrically opposed flexible lock fingers at the connector end that are spaced radially outwardly of the protrusion and that are orthogonally related to the lock tongues so that the flexible lock fingers are adapted to engage diametrically opposed lock tongues of a mating connector body having like lock means.

10. The fiber optic inline connector as defined in claim 9 wherein the cable passage is circular for accommodating a single fiber optic cable.

11. The fiber optic inline connector as defined in claim 9 wherein the cable passage is shaped for accommodating a plurality of fiber optic cables.

12. The fiber optic inline connector as defined in claim 9 further including a fiber optic cable having a ferrule attached to it that is disposed in a terminal cavity portion of the cable passage at the cable end of the connector body and a terminal position assurance device that is attached to the cable end of the connector body to retain the ferrule in the terminal cavity portion of the cable passage.

13. The fiber optic inline connector device as defined in claim 12 wherein the terminal position assurance device comprises a shell that is retained on the cable end of the connector body and an end wall that is juxtaposed a cable end face of the connector body for retaining the ferrule in the terminal cavity portion of the cable passage.

14. The fiber optic inline connector as defined in claim 13 wherein the connector body has a pair of circumferentially spaced tabs at the cable end of the connector body and the shell has undercut slots that retain that receive the tabs to retain the terminal position assurance device in the centerline direction and locate terminal position assurance device circumferentially.

* * * * *